United States Patent
Urata

(10) Patent No.: US 7,245,448 B2
(45) Date of Patent: Jul. 17, 2007

(54) INFORMATION RECORDING APPARATUS AND DATA WRITING CONTROL DEVICE THEREFOR

(75) Inventor: Yukio Urata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/079,295

(22) Filed: Mar. 15, 2005

(65) Prior Publication Data

US 2005/0157419 A1 Jul. 21, 2005

Related U.S. Application Data

(63) Continuation of application No. PCT/JP03/01879, filed on Feb. 20, 2003.

(51) Int. Cl.
G11B 15/12 (2006.01)
G11B 5/596 (2006.01)
G11B 5/09 (2006.01)

(52) U.S. Cl. .................. 360/62; 360/63; 360/77.05; 360/51

(58) Field of Classification Search .............. None
See application file for complete search history.

(56) References Cited

U.S. PATENT DOCUMENTS 6,697,891 B2 * 2/2004 Emberty et al. .......... 710/65
6,914,746 B1 * 7/2005 Meyer .................. 360/78.12
6,952,322 B1 * 10/2005 Codilian et al. ......... 360/77.05
2002/0135927 A1 * 9/2002 Yatsu .......................... 360/75
2005/0188409 A1 * 8/2005 Daniels ....................... 725/88

FOREIGN PATENT DOCUMENTS

| JP | 53-76813 | * | 7/1978 |
| JP | 63-66773 | * | 3/1988 |
| JP | 3-201276 | * | 9/1991 |
| JP | 7-334808 | | 12/1995 |
| JP | 9-128916 | | 5/1997 |
| JP | 2002-184138 | | 6/2002 |

OTHER PUBLICATIONS

International Search Report w/translation dated Jun. 10, 2003.*

* cited by examiner

Primary Examiner—Andrew L. Sniezek
(74) Attorney, Agent, or Firm—Armstrong, Kratz, Quintos, Hanson & Brooks, LLP

(57) ABSTRACT

A plurality of recording media combined integrally having a plurality of recording surfaces; and a plurality sets of reading heads and writing heads, combined integrally, provided for the respective ones of the plurality of recording surfaces, are provided. Upon writing data on each recording medium with the writing head provided therefor, a writing position is controlled as a result of positioning information previously provided on the recording media including the recording medium other than the each recording medium being read with the reading heads provided therefor.

9 Claims, 6 Drawing Sheets

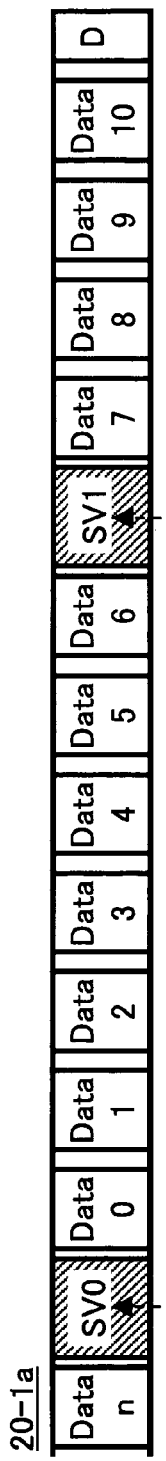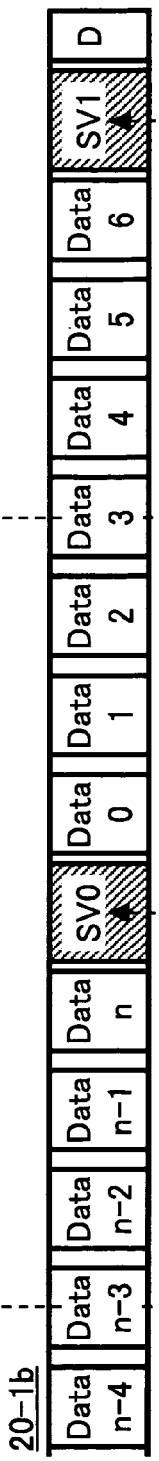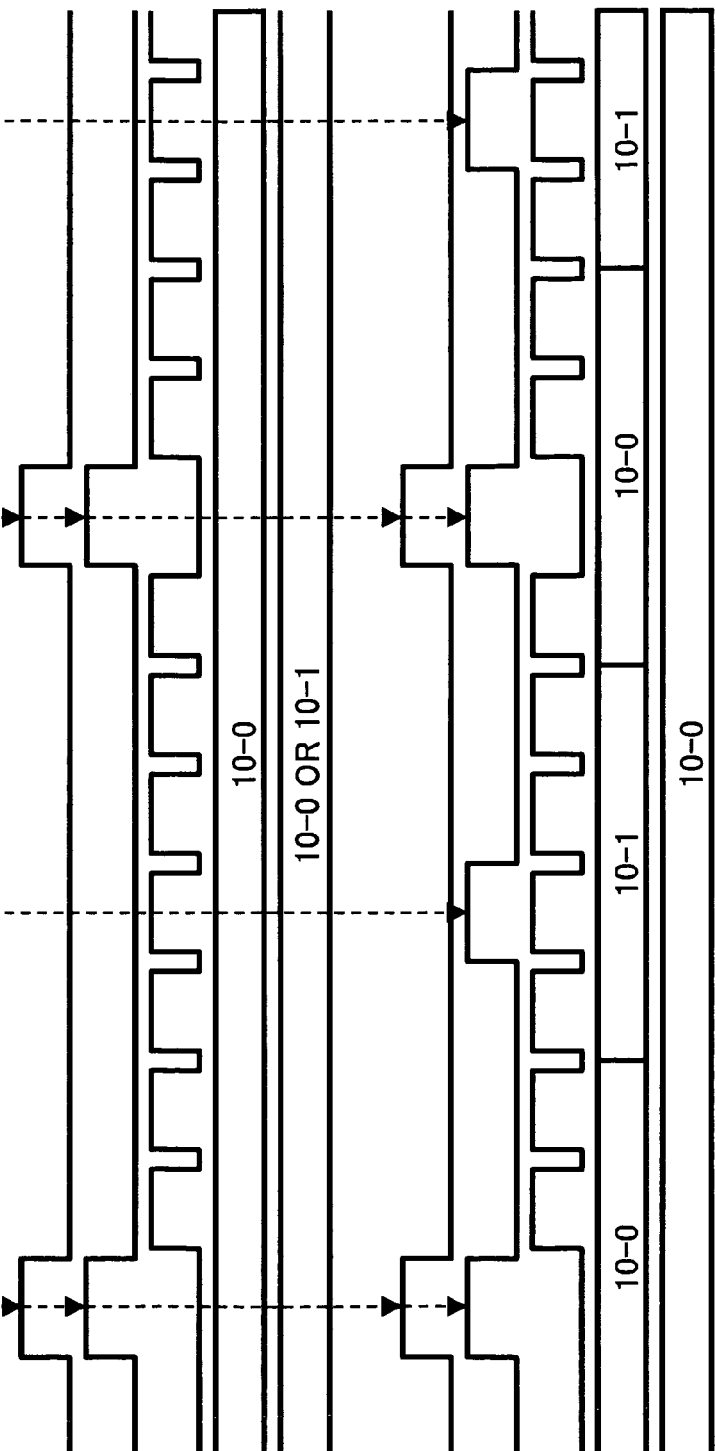

INFORMATION RECORDING APPARATUS AND DATA WRITING CONTROL DEVICE THEREFOR

CROSS-REFERENCE TO RELATED APPLICATION

This application is a U.S. continuation application filed under 35 USC 111(a) claiming benefit under 35 USC 120 and 365(c) of PCT application JP03/01879, filed Feb. 20, 2003. The foregoing applications are hereby incorporated herein by reference.

BACKGROUND OF THE INVENTION

1. Field of the Invention

The present invention relates to an information recording apparatus and a data writing control device therefor, and, in particular, to an information recording apparatus employing recording media including a plurality of recording surfaces integrally combined, and a plurality of sets of reading heads and writing heads provided therefor, as well as a data writing control device therefor.

2. Description of the Related Art

As a typical example of such a information recording apparatus employing recording media including a plurality of recording surfaces integrally combined, and a plurality of sets of reading heads and writing heads provided therefor, a hard disk drive (HDD) is known which is used heavily as a storage in a personal computer or such.

Along with a recent demand for an increase of a recording speed and also of a recording density of the hard disk drive, it is desired to further increase the number of information recording tracks per unit width regarded as the information recording density of a disk-shaped recording medium, i.e., a so-called TPI (track per inch). In order to increase the TPI, it is necessary to increase an accuracy of positioning of a relevant writing head at a desired track, i.e., an on-track accuracy. In order to increase the on-track accuracy, it is required to increase a servo sampling frequency for obtaining a positioning signal provided for appropriately positioning the read/write heads. In order to increase the servo sampling frequency for the purpose of achieving high-speed and high-density information recording, it is necessary to shorten intervals at which servo information is previously provided on the disk-shaped recording medium.

According to a so-called data-surface-servo method which is applied recently as a data writing positioning method of a hard disk drive, the above-mentioned servo information provided for positioning the writing head is not provided in a certain special zone, but is provided in a zone of the recording surface which is originally provided for writing user data, in a mixed manner. Accordingly, the shortening of the intervals of the servo information provided on the disk-shaped recording medium for the purpose of increasing the servo sampling frequency to achieve high-speed and high-density information recording, may result in a substantial reduction of the user data recording capacity at the same time accordingly. As a result, the substantial data recording density may degrade, and thus, the data format efficiency may degrade.

Further, an apparatus in which the hard disk drive is installed may be a carriable or a mobile apparatus such as a notebook personal computer, a cellular phone, or such. As a result, a performance is required for the hard disk drive in which, even an external vibration or an impact is applied to the device, a normal operation can be kept uninterrupted. For this purpose, the above-mentioned servo sampling frequency may be further increased, or, a shock sensor or such may be provided, and an information writing operation may be forcibly interrupted when an external impact more than a certain level is detected, for at least avoiding an erroneous recording which otherwise occurs due to occurrence of a so-called off-track phenomenon in which the writing head deviates from a relevant track during information writing operation. However, according to the latter method, an actual control to interrupt the information writing operation is very difficult. In fact, according to a delicate adjustment variation, the writing operation may be forcibly interrupted even when the impact actually applied is not so large as to actually cause the off-track phenomenon. In such a case, the data recording performance may degrade. On the other hand, the off-track phenomenon actually may occur even by a light impact, and, in such a case, an erroneous recording operation occurs without an interruption of the information writing operation, whereby data on a neighbor track may be erroneously overwritten and thus erased, or such.

SUMMARY OF THE INVENTION

The present invention is devised in consideration of the above-mentioned problem, and an object of the present invention is to provide an information recording apparatus in which a sufficiently high servo sampling frequency is applicable even in the information recording apparatus achieving high-speed and high-density information recording, and also, degradation of a data recording efficiency on the recording medium is positively avoided, and a data writing control device by which such a function is achievable.

In order to achieve this object of the present invention, a configuration is applied in which when data is written on each recording surface of a recording medium with a writing head provided therefor, a writing position control operation therefor is carried out with the use of positioning information (servo information) previously provided on another recording surface read in with a reading head provided therefor. As a result of even the servo information of the other recording surface than that on which user data is currently written being thus read and applied for the writing head positioning control, it is possible to continue the writing operation even during the writing head being located at the position of the servo information on the other recording surface. On the other hand, according to a related art, servo control is carried out only with the use of servo information which is intermittently provided on the writing track. As a result, the data writing should be interrupted on the position at which the servo information is set, according to the related art. However, according to the present invention, it is possible to remarkably improve the data recording efficiency by applying the servo control with the use of the servo information provided on the other recording surface as mentioned above.

Further, according to another aspect of the present invention, on each recording surface, positioning information (servo information) is previously provided, a relevant reading heads read this information, and thereby, writing positioning control for writing data on the same recording surface or another recording surface is carried out. The positioning information is located at (angular) positions, which are different from those aligned among the respective recording surfaces. By applying the configuration in which the servo information set positions thus deviate from each other among the respective recording surfaces, it is possible to effectively increase the servo sampling frequency as a result of a control being carried out in such a manner that the servo information of the different recording surfaces may be read in sequence. Also, by applying this configuration and control scheme, it is possible to avoid degradation of the overall data recording efficiency of the recording media including the plurality of recording surfaces.

That is, in order to increase the servo sampling frequency assuming that a control is made by reading the servo information from a single recording surface of a recording medium, it is necessary to provide the servo information with shortened intervals accordingly on the data recording track. As a result, the data recording efficiency degrades accordingly. On the other hand, by applying the above-mentioned control scheme in which the servo information set on the plurality of recording surfaces of the different recording media is used for writing positioning control for written information on a single recording surface, it becomes not necessary to shorten the intervals of the servo information required to be set on the data recording track of each recording surface, according to the present invention.

Thus, according to the present invention, it is possible to increase the servo sampling frequency effectively, without degrading the data recording efficiency or the data format efficiency, and as a result, it is possible to provide an information recording apparatus by which data recording can be carried out stably at a high recording speed and with a high recording density.

BRIEF DESCRIPTION OF THE DRAWINGS

Other objects and further features of the present invention will become more apparent from the following detailed description when read in conjunction with the accompanying drawings:

FIGS. 7A and 7B show a configuration of a data format and showing the servo information setting positions provided between different disk recording surfaces shown in FIG. 2A;

FIGS. 8A through 8E show waveforms of various signals applied upon data reading in the hard disk drive according to the embodiment of the present invention; and FIGS. 9A through 9E show waveforms of various signals applied upon data writing in the hard disk drive according to the embodiment of the present invention; and

DETAILED DESCRIPTION OF THE PREFERRED EMBODIMENT

An embodiment of the present invention will be described with reference to figures.

Figure 1:
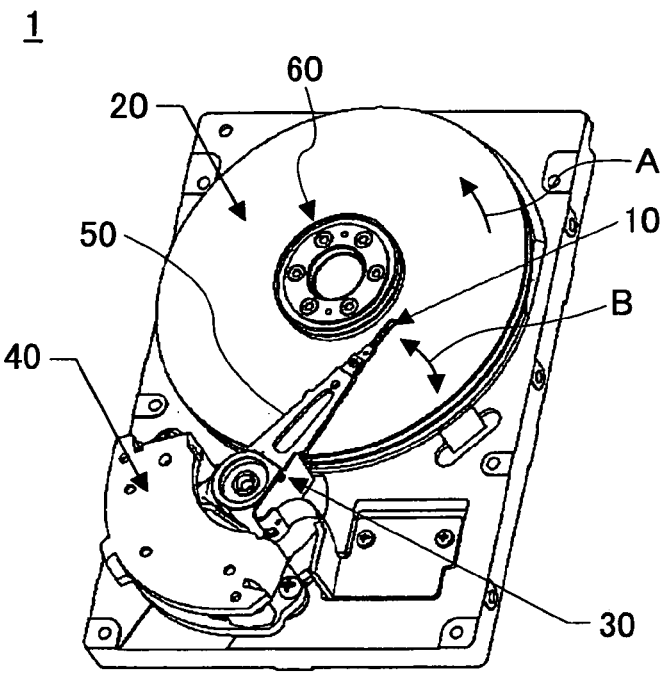
FIG. 1 shows a general perspective view of a disk driving part of a hard disk drive according to one embodiment of the present invention.
Figure 2A:
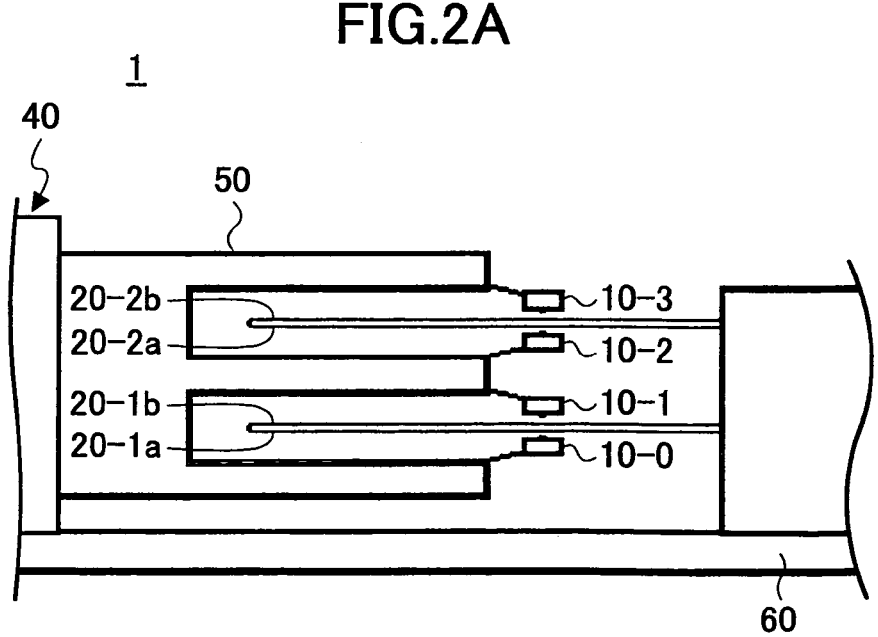
FIG. 2A shows a longitudinal elevational sectional view of a part of the configuration shown in FIG. 1 for diagrammatically illustrating a relationship between disk-shaped recording media and relevant head units.

FIG. 1 is a perspective view showing a general configuration of a disk driving part 1 of a hard disk drive according to an embodiment of the present invention. FIG. 2A diagrammatically shows a relationship between disk-shaped recording media and reading/writing heads shown in FIG. 1. The hard disk drive according to the embodiment of the present invention includes the disk driving part 1 and a control substrate 2 described later.

As shown, the disk driving part 1 of the hard disk drive generally includes magnetic disks 20 which are the disk-shaped recording media; a spindle motor 60 driving and rotating the magnetic disks 20 in a direction A shown in FIG. 1; magnetic head devices 10 reading data from the magnetic disks 20 or writing data in the magnetic disks 20; an actuator arm 50 supporting the magnetic head devices 10 at extending ends thereof; and a head driving control part 40 including a voice coil motor and a mechanism to control the operation thereof for driving and rotating the actuator arm 50 to move the magnetic head devices 10 provided at the extending ends thereof in a direction B of FIG. 1, and thus positioning the magnetic head devices 10 at an arbitrary position in a radial direction on the magnetic disks 20.

As shown in FIG. 2A, in this embodiment, the magnetic disks 20 include total two disk-shaped recording media integrally rotated by the spindle motor 60, and these disk-shaped recording media have total four recording surfaces 20-1$a$, 20-1$b$, 20-2$a$ and 20-2$b$ as shown provided on obverse and reverse sides thereof. These four recording surfaces are integrally combined as a result of the two disk-shaped recording media 20, on which the recording surfaces are thus provided, being integrally fixed to the spindle motor 60, and thus, are driven and rotated thereby integrally.

Figure 2B:
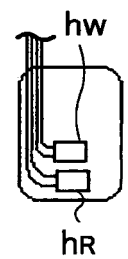
FIG. 2B shows a plan view of each head unit shown in FIG. 2A diagrammatically.

Further, the magnetic head devices 10 include four head units 10-0, 10-1, 10-2 and 10-3 provided for the above-mentioned four recording surfaces 20-1$a$, 20-1$b$, 20-2$a$ and 20-2$b$ of the magnetic disks 20, respectively. Each of these head units 10-0 through 10-3 includes, as shown in FIG. 2B, a reading head $h_R$ and a writing head $h_W$ provided in the vicinity of one another. These four head units 10-0 through 10-3 are integrally fixed to the actuator arm 50, thus combined integrally, and are integrally driven thereby in the radial direction of the magnetic disks 20.

Figure 3:
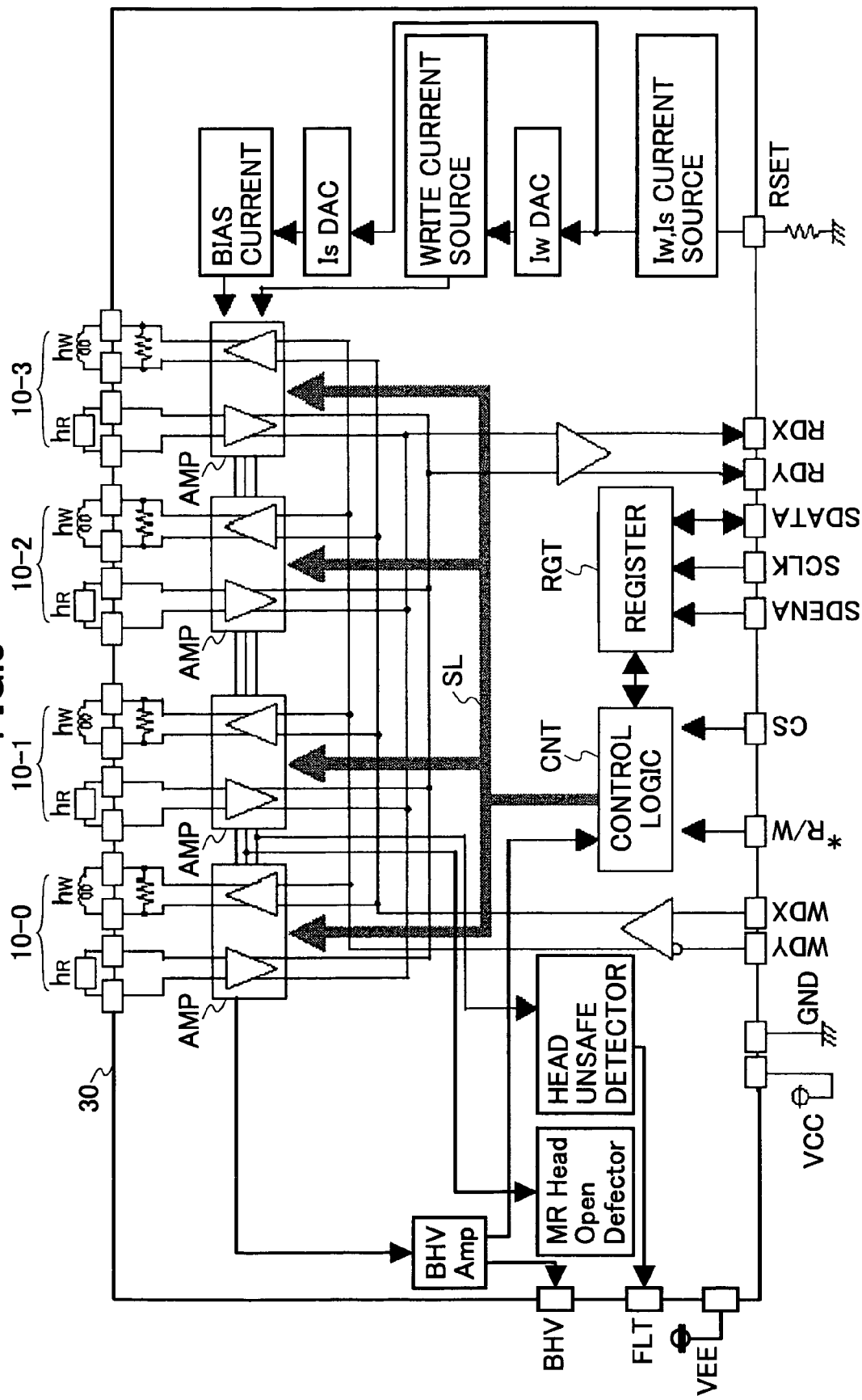
FIG. 3 shows an internal configuration of a head IC shown in FIG. 1.

Further, a head IC (pre-amplifier) 30 is provided in the disk driving part 1 as shown in FIG. 1. The head IC 30 has a function, whereby, according to a control signal transmitted from a read channel circuit 130 on the control substrate 2 (see FIG. 4) described later, the head unit to currently carry out data reading and the head unit to currently carry out data writing are selected from among the respective head units 10-0 through 10-3 of the magnetic head devices 10. Then, the head IC 20 causes the head unit thus selected to currently carry out data reading to read data from the relevant recording surface of the magnetic disk, or to currently carry out data writing to write data in the relevant recording surface of the magnetic disk. FIG. 3 shows a circuit diagram of the head IC.

As shown in FIG. 3, the head IC 30 has an amplifier circuit AMP for the above-mentioned head set $h_R$ and $h_W$ of each of the head units 10-0 through 10-3, and any one thereamong is selectively activated according to a selecting signal SL provided by a control logic circuit CNT. According to the embodiment of the present invention, the reading head $h_R$ and the writing head $h_W$ of the respective different head units can be selectively activated simultaneously. This selecting signal SL is generated as a result of the control logic circuit CNT receiving control signals SDENA, SCLK and SDATA transmitted from the read channel circuit 130 on the control substrate 2, and selecting the specific head units in cooperation with a register circuit RGT.

Data read out from the relevant recording surface of the magnetic disk 20 by means of the reading head $h_R$ of the thus-selected head unit is amplified by the relevant amplifier circuit AMP, and after that, is transmitted to the read channel circuit 130 on the control substrate 2 as reading signals RDY and RDX. Further, write data WDY and WDX transmitted from the read channel circuit 130 to the head IC 30 is written in the relevant recording surface of the magnetic disk by the writing head $h_W$ of the selected head unit.

Figure 4:
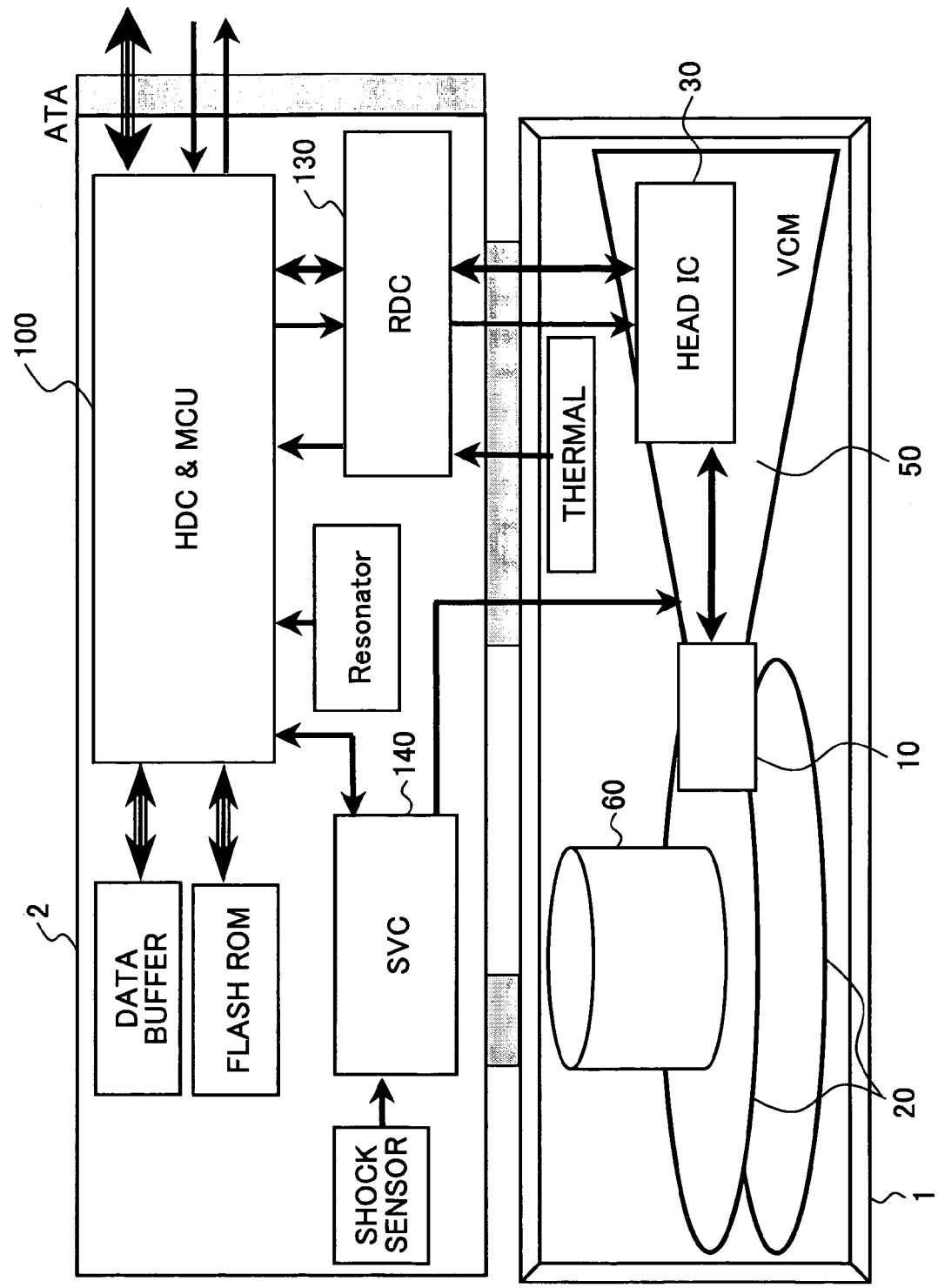
FIG. 4 shows a block diagram of the disk driving part and a control substrate of the hard disk drive according to the embodiment of the present invention, for illustrating a relation between the disk driving part and the control substrate.
Figure 5:
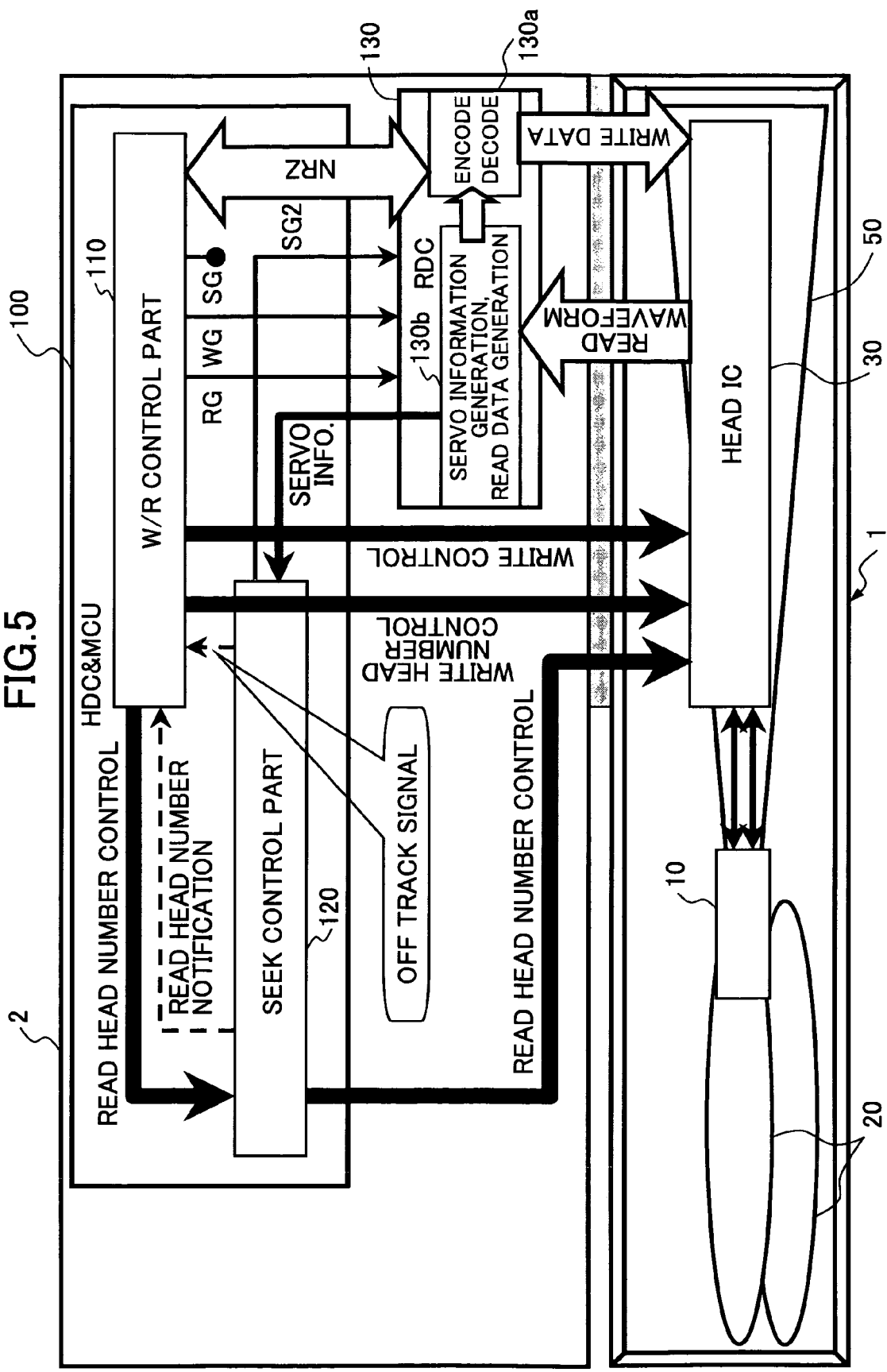
FIG. 5 shows a block diagram of a part of the configuration shown in FIG. 4 in detail for illustrating a flow of writing/reading control signals.
Figure 6:
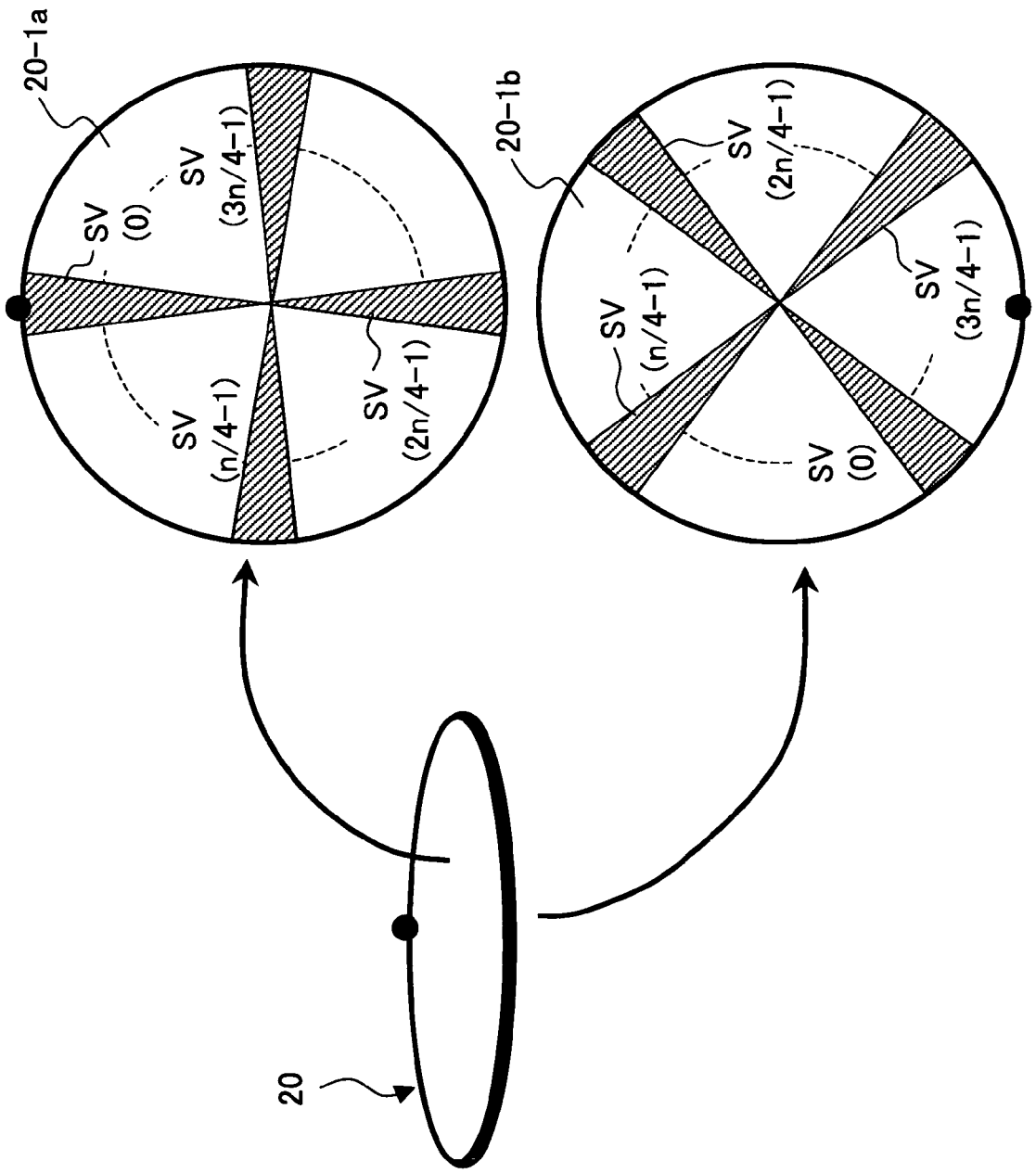
FIG. 6 illustrates servo information setting positions on a disk recording surface shown in FIG. 2A.

FIG. 4 shows a block diagram of a configuration of the control substrate 2. FIG. 5 especially shows flows of the control signals for selecting the head unit having the reading head activated at each timing and the head unit having the writing head activated at each timing, as well as flows of the reading signal and the writing signal. Further, FIGS. 6, 7A and 7B show an example of setting the servo information, that is, head position control information provided on the recording surfaces of the disk-shaped recording media. FIGS. 8A through 8E and 9A through 9E show waveforms of servo gate signals SG, SG2 (FIGS. 8A, 8B, 9A and 9B) as well as a read gate signal (FIG. 8C), a write gate signal (FIG. 9C) and head selection control signals (FIGS. 8D, 8E, 9D and 9E).

The control substrate 2 has a control circuit mounted thereon for carrying out control of the disk driving part 1 of the hard disk drive shown in FIGS. 1 and 2A. As shown in FIG. 4, the control circuit on the control substrate 2 includes, in addition to the read channel circuit 130, a device control circuit 100 and a servo control circuit 140 for controlling the head driving control part 40 of the head driving part 1. As shown in FIG. 5, the device control circuit 100 includes a writing/reading control circuit 110 and a seek control circuit 120.

The read channel circuit 130 includes an encode/decode part 130a and a servo information generation and read data generation part 130b. The encode/decode part 130a transmits/receives data via the head IC 30 of the disk driving part 1, and carries out encoding processing for the write data to be written in the disk-shaped recording media or decoding processing for read date read out from the disk-shaped recording media. Further, the encode/decode part 130a carries out transmission/reception of the read/write data to/from the writing/reading control part 110 of the device control circuit 100 in a form of NRZ code.

The servo information generation and read data generation part 130b receives a read waveform from the disk-shaped recording medium via the head IC 30, generates read data therefrom, and transfers it to the encode/decode part 130a. Further, the servo information generation and read data generation part 130b generates the servo information from the read waveform, which servo information is information indicating a track position on the recording surface of the disk-shaped recording media at which the currently used reading head is located, and transfers the servo information to the seek control part 120 of the device control circuit 100.

The writing/reading control part 110 of the device control circuit 100 generates the read gate signal RG (see FIG. 8C) indicating a timing of reading data from the recording surface of the magnetic disk with the use of the reading head $h_R$; and the write gate signal WG (see FIG. 9C) indicating a timing of writing data in the recording surface of the magnetic disk with the use of the writing head $h_W$. Further, the writing/reading control part 110 generates the read head number control signal (see FIG. 8E) indicating the number of the head unit having the reading head $h_R$ to activate at each timing and the write head number control signal (see FIG. 9E) indicating the number of the head unit having the writing head $h_W$ to activate at each timing. Further, the writing/reading control part 110 generates the servo gate signal SG (see FIGS. 8A and 9A) in a fixed period. Further, the writing/reading control part 110 generates the write control signal (*R/W in FIG. 3) indicating whether a current disk control mode corresponds to a reading mode (FIGS. 8A through 8E) or a writing mode (FIGS. 9A through 9E). The head IC 30 receiving this signal appropriately carries out writing control, according to the contents of the thus-received signal, for reading data from the relevant disk recording surface or writing data in the relevant disk recording surface with the reading head or the writing head of the head currently selected.

Further, the seek control part 120 determines whether or not the track, on the disk-shaped recording medium, on which the currently applied reading head is located is a correct one, based on the servo information received from the read channel circuit 130. When determining that the track is not a correct one, the seek control part 120 provides an off-track signal indicating this situation to the writing/reading control part 110. The writing/reading control part 110 receiving this signal carries out predetermined off-track processing for preventing data already written in the disk-shaped recording medium from being overwritten and erased.

Further, the seek control part 120 generates the servo gate signal SG2 (FIG. 8B) the same as the servo gate signal SG (FIG. 8A) provided by the writing/reading control part 110 upon the data reading operation. However, upon the data writing operation, the seek control part 120 generates the servo gate signal SG2 (FIG. 9B) in which a signal generation frequency thereof is doubled. Further, the seek control part 120 generates the read head number control signal (FIG. 9D) in which the head unit number is changed into the different head unit number alternately, based on the read head number control signal provided by the writing/reading control part 110. Further, the seek control part 120 notifies the writing/reading control part 110 of the head unit number indicated by this read head number control signal, i.e., the number of the head unit having the reading head to be currently applied, in a form of a read head number notification signal. The above-mentioned servo gate signal SG2 is a signal indicating a timing of reading the servo information previously set in the track of the disk-shaped recording medium on which the reading head currently applied is located.

By configuring as described above, it is possible to introduce the present invention, only by changing the seek control part 120 in the device control circuit 100 while the control scheme other than that is kept unchanged from the prior art. That is, even such a control manner that, upon data writing in the disk recording surface, the servo information is read only from the relevant writing recording surface, and therewith, the servo control is carried out, is kept unchanged, the present invention can be introduced in which the servo information is read from a plurality of recording surfaces, and therewith, the servo control is carried out, only by changing the seek control part 120 as mentioned above.

Operation of the control circuit on the control substrate 2 configured as described above is described next. Description is made only for operation for a case where data reading/writing is carried out with the use of the head units 10-0 and 10-1 on the relevant recording surfaces 20-1a and 20-1b provided on both sides of one disk-shaped recording medium of the two disk-shaped recording media of the magnetic disks 20, for the sake of simplicity. It is noted that, this configuration is merely an example, and, application of the present invention is not limited to this example. For example, although detailed description is omitted, such a configuration is also regarded as one mode of the present invention as that, upon writing data on one of all the four recording surfaces of the disk-shaped recording media, servo sampling is carried out with reading the servo information from these respective four recording surfaces in sequence.

As shown in FIG. 6, on the recording surfaces 20-1a and 20-1b, the servo information (indicated as fan-shaped areas with hatching) is provided in mutually different angular positions between the recording surfaces. In FIG. 6, a black dot located at a periphery of each recording surface represents a corresponding angular position between both recording surfaces. FIGS. 7A and 7B show the same positions at which the servo information (indicated as rectangles with hatching) is set but is shown in such a manner that the track is indicated as a straight line.

The description is made with reference to FIGS. 7A, 7B, 8A through 8E and 9A through 9E. FIGS. 8A through 8E show the respective signal waveforms generated when data is continuously read from the disk recording surface 20-1a. The signal waveform shown in FIG. 8A is a waveform of the servo gate signal SG, and is not directly applied for a timing at which the servo gate signal is read in the embodiment of the present invention. The SG2 shown in FIG. 8B is the servo gate signal which is directly applied for a timing at which the servo gate signal is read in the embodiment of the present invention as mentioned below.

When the continuous data reading is carried out from the recording surface 20-1a, the read head number control signal designating the head unit 10-0 provided for the recording surface 20-1a as the head unit having the reading head to be currently applied is generated (see FIG. 8D). Also, the servo gate signal SG2 such as that shown in FIG. 8B is generated. Thereby, the servo information SV0, SV1, . . . (see FIG. 7A) set on the same recording surface 20-1a at predetermined intervals is read or sampled by the reading head of the relevant head unit 10-0 in sequence. From the servo information thus read, corresponding servo information is generated by the servo information generation and read data generation part 130b, is then sent to the seek control part 120, which part then determines whether or not the reading head is located on the correct track. Thus, the seek control is carried out. It is noted that, as to the designation of the head unit with the writing head to be currently applied, which is however not actually applied during such a continuous data reading operation, the head unit provided for the recording surface 20-1a or 20-1b may be designated (see FIG. 8E).

FIGS. 9A through 9E shows the respective signal waveforms generated when data is written in the disk recording surface 20-1a. It is noted that the signal waveform shown in FIG. 9A is the waveform of the servo gate signal SG, and is not directly applied as a timing designation signal for the servo information sampling. The SG2 shown in FIG. 9B is the servo gate signal which is directly applied for a timing at which the servo gate signal is read in the embodiment of the present invention as mentioned below.

When data is continuously written in the recording surface 20-1a, the read head number control signal alternately designating the head unit 10-0 provided for the recording surface 20-1a and the head unit 10-1 provided for the recording surface 20-1b, as the head unit with the reading head to be currently applied, is generated from the seek control part. In this case, as shown in FIG. 9B, the servo gate signal (pulse) is generated at a frequency (sampling frequency) which is double of that applied for the above-mentioned continuous data reading operation. This is because this servo gate signal is used to read or sample the servo information from the two recording surfaces 20-1a and 20-1b (see FIGS. 6, 7A and 7B) alternately at the sampling double rate.

Thereby, the servo information SV0, SV1, . . . disposed on the two different recording surfaces at fixed intervals (FIGS. 7A and 7B) is read in sequence by the relevant respective reading heads of the head units 10-0 and 10-1 alternately. Then, the thus-read servo information is used by the servo information generation and read data generation part 130b to generate relevant servo information, which is then sent to the seek control part 120. The seek control part 120 determines, based on the thus-sent servo information, whether or not the reading head is located on the correct track. Thus, the seek control is achieved.

Thus, according to the embodiment of the present invention, it is possible to increase the servo information sampling frequency into integral multiples of the frequency corresponding to the intervals at which the servo information is set in each disk recording surface. As a result, it is possible to carry out highly accurate servo control. Further, simultaneously, it is not necessary to degrade the data recording capacity of the tracks of the recording surfaces since the intervals at which the servo information is set on each disk recording surface should not be shortened for this purpose.

Further, since the servo information sampling frequency is increased in the servo control, it is possible to achieve a configuration in which erroneous operation is not likely to occur even when a vibration or an impact is externally applied to the apparatus. Further, for a case where a sufficient offset margin for data reading can be ensured and thus it is not necessary to increase the servo information sampling frequency, it is possible in this case to widen the service information setting intervals for each recording surface of the disk-shaped recording media by applying the above-described control scheme according to the present invention in which the servo information is sampled alternately from among a plurality of recording surfaces of disk-shaped recording media. Thereby, it is possible to improve the data format of the disk-shaped recording media effectively.

As shown in FIG. 2B, in each of the head unit, the reading head $h_R$ and the writing head $h_W$ are disposed in the vicinity of one another for the purpose of miniaturization of the head device or such. In such a configuration, if these two heads are always activated within a short duration in the common head unit alternately, both receive influence of heat generated by itself from one another, and thus, are likely to degrade in the basic performance. According to the present invention, when data is written in a disk recording surface, servo information sampling is carried out with reading of the servo information from a plurality of different recording surfaces alternately. As a result, while servo information sampling is carried out at a high rate, the head unit having the reading head to currently read the servo information is switched in sequence. That is, the head unit having the writing head to write data is fixed while the head unit having the reading head to read the servo information is switched among the plurality of ones as mentioned above. Accordingly, it is possible to effectively reduce a frequency at which the reading head and the writing head within the same head unit are activated within a short duration even while the servo information sampling is carried out at a high rate. Accordingly, it is possible to effectively reduce thermal influence between the reading/writing heads, to elongate the operating life thereof, to avoid erroneous operation thereof, and so forth.

Further, in the embodiment of the present invention, it is preferable to carry out positional correction (eccentricity correction or such) among the respective head units before shipment of the product, whereby occurrence of a deviation in a track position (positions along a radial direction) at which the relevant reading/writing head is located at each timing between the recording surface in which data is written and the recording surface from which the servo information is read. Further, it is preferable to provide a configuration by which, also after the shipment, such positional correction operation between the respective head units is carried out automatically within the apparatus. Thus, it is preferable to provide a configuration by which the positional correction can be appropriately carried out in response to an occurrence of the positional deviation after the shipment, due to aging, environmental factors such as ambient temperature, ambient humidity, or such. Japanese Laid-open Patent Applications Nos. 7-334808, 9-128916 and 2002-184138, each being filed by the present applicant and so forth disclose arts to achieve such a configuration.

Further, the present invention is not limited to the above-described embodiment, and variations and modifications may be made without departing from the basic concept of the present invention claimed below.

What is claimed is:

1. An information recording apparatus comprising:
a plurality of recording media, combined integrally, having a plurality of recording surfaces; and
a plurality sets of reading heads and writing heads, combined integrally, provided for the respective ones of said plurality of recording surfaces, wherein:
upon writing data in each recording medium with the writing heads of the plurality sets of reading heads and writing heads, a writing position is controlled based on positioning information read out at least from the recording medium other than said recording medium in which data is being written;
the plurality sets of reading heads and writing heads each individually can be separately controlled; and
even when reading operation is carried out with one head of the plurality sets of reading heads and writing heads, writing operation can be carried out simultaneously with another head of the plurality sets of reading heads and writing heads,
wherein the reading operation reads data and is not limited to the reading of servo-information or positioning information;
a head IC is provided and configured so as to be able to simultaneously activate the reading head and the writing head of different head units, each head unit comprising a pair or the reading head and the writing head, provided for the respective one of the recording surfaces; and
upon data writing, the head IC provides such a head select signal as to alternately activate the reading heads of the different head units for head positioning control respectively in timing for reading the positioning information, with activating the writing head of the single head unit in data writing timing, while, upon data reading, the head IC provides such a head select signal as to activate the reading head of the single head unit for head positioning control and data reading,
wherein when a writing head of the plurality sets of reading heads and writing heads is activated for writing data in one recording surface, a reading head of the plurality sets of reading heads and writing heads, which is not necessary one provided for the same recording surface, is activated to read writing head positioning information, and
the reading head and the writing head of the plurality sets of reading heads and writing heads provided for each recording surface of the recording medium are provided in the vicinity of one another.

2. The information recording apparatus as claimed in claim 1, wherein:
said recording media comprising the plurality of recording surfaces comprises a plurality of magnetic disks, and, a configuration is provided such that, when data is written therein, the respective recording surfaces are driven and rotated integrally, wherein:
said positioning information is provided in such a manner that angular positions thereof may be different between respective different recording surfaces.

3. The information recording apparatus as claimed in claim 2, wherein:
when the writing head of the plurality sets of reading heads and writing heads is activated for writing data in one recording surface; the reading head of the plurality sets of reading heads and writing heads, which is not necessary one provided for the same recording surface, is activated to read writing head positioning information, and
the reading head of the plurality sets of reading heads and writing heads and the writing head of the plurality sets of reading heads and writing heads provided for each recording surface of the recording medium are provided in the vicinity of one another.

4. An information recording apparatus comprising:
a plurality of recording media, combined integrally, having a plurality of recording surfaces; and
a plurality sets of reading heads and writing heads, combined integrally, provided for the respective ones of said plurality of recording surfaces, wherein:
each recording medium is previously provided with positioning information, said positioning information being used for controlling a writing position upon writing data in said recording medium or in another recording medium as a result of the positioning information being read with a reading head of the plurality sets of reading heads and writing heads, wherein:
said positioning information is provided in the recording media at positions, which are made different among the respective recording media,
wherein the reading head of the plurality sets of reading heads and writing heads is able to read data as well as positioning information while a writing head simultaneously writes data of the plurality sets of reading heads and writing heads;
a head IC is provided and configured so as to be able to simultaneously activate the reading head and the writing head of different head units, each head unit comprising a pair or the reading head and the writing head, provided for the respective one of the recording surfaces; and upon data writing, the head IC provides such a head select signal as to alternately activate the reading heads of the different head units for head positioning control respectively in timing for reading the positioning information, with activating the writing head of the single head unit in data writing timing, while, upon data reading, the head IC provides such a head select signal as to activate the reading head of the single head unit for head positioning control and data reading, wherein when a writing head of the plurality sets of reading heads and writing heads is activated for writing data in one recording surface, a reading head of the plurality sets of reading heads and writing heads, which is not necessary one provided for the same recording surface, is activated to read writing head positioning information, and the reading head and the writing head of the plurality sets of reading heads and writing heads provided for each recording surface of the recording medium are provided in the vicinity of one another.

5. The information recording apparatus as claimed in claim 4, wherein:

said recording media comprising the plurality of recording surfaces comprise a plurality of magnetic disks, and, a configuration is provided such that, when data is written therein, each recording surface is driven and rotated integrally, wherein:

said positioning information is provided in such a manner that angular positions thereof may be different between respective different recording surfaces.

6. The information recording apparatus as claimed in claim 5, wherein:

when the writing head of the plurality sets of reading heads and writing heads is activated for writing data in one recording surface, the reading head of the plurality sets of reading heads and writing heads, which is not necessary one provided for the same recording surface, is activated to read writing head positioning information, and the reading head of the plurality sets of reading heads and writing heads and the writing head of the plurality sets of reading heads and writing heads provided for each recording surface of the recording medium are provided in the vicinity of one another.

7. The information recording apparatus as claimed in claim 4, wherein:

when the writing head of the plurality sets of reading heads and writing heads is activated for writing data in one recording surface, the reading head of the plurality sets of reading heads and writing heads, which is not necessary one provided for the same recording surface, is activated to read writing head positioning information, and the reading head of the plurality sets of reading heads and writing heads and the writing head of the plurality sets of reading heads and writing heads provided for each recording surface of the recording medium are provided in the vicinity of one another.

8. A data writing device of an information recording apparatus comprising:

a plurality of recording media, combined integrally, having a plurality of recording surfaces; and a plurality sets of reading heads and writing heads, combined integrally, provided for the respective ones of said plurality of recording surfaces, wherein:

upon writing data on each recording medium with a writing head of the plurality sets of reading heads and writing heads, a writing position is controlled based on positioning information read out at least from the recording surface other than said the recording surface in which data is being written;

a reading head and a writing head of the plurality sets of reading heads and writing heads can be separately controlled; and even when reading operation is carried out with one reading head of the plurality sets of reading heads and writing heads, writing operation can be carried out simultaneously with another write head of the plurality sets of reading heads and writing heads, wherein the reading operation reads data and is not limited to the reading of servo-information or positioning information;

a head IC is provided and configured so as to be able to simultaneously activate the reading head and the writing head of different head units, each head unit comprising a pair or the reading head and the writing head, provided for the respective one of the recording surfaces; and upon data writing, the head IC provides such a head select signal as to alternately activate the reading heads of the different head units for head positioning control respectively in timing for reading the positioning information, with activating the writing head of the single head unit in data writing timing, while, upon data reading, the head IC provides such a head select signal as to activate the reading head of the single head unit for head positioning control and data reading, wherein when a writing head of the plurality sets of reading heads and writing heads is activated for writing data in one recording surface, a reading head of the plurality sets of reading heads and writing heads, which is not necessary one provided for the same recording surface is activated to read writing head positioning information, and the reading head and the writing head of the plurality sets of reading heads and writing heads provided for each recording surface of the recording medium are provided in the vicinity of one another.

9. An information recording apparatus having a control circuit controlling a position of a writing head configured to write information in a recording surface of a recording medium and controlling a position of a reading head configured to read information from the recording surface, in such a manner that, mutually independent control thereof may be made with respect to the recording surface to write information in or to read information from, wherein:

the reading head and the writing head can be separately controlled; and even when reading operation is carried out with reading head, writing operation can be carried out simultaneously with another writing head, wherein the reading operation reads data and is not limited to the reading of servo-information;

a head IC is provided and configured so as to be able to simultaneously activate the reading head and the writing head of different head units, each head unit comprising a pair or the reading head and the writing head, provided for the respective one of the recording surfaces; and upon data writing, the head IC provides such a head select signal as to alternately activate the reading heads of the different head units for head positioning control respectively in timing for reading the positioning information, with activating the writing head of the single head unit in data writing timing, while, upon data reading, the head IC provides such a head select signal as to activate the reading head of the single head unit for head positioning control and data reading, wherein when a writing head of the plurality sets of reading heads and writing heads is activated for writing data in one recording surface, a reading head of the plurality sets of reading heads and writing heads, which is not necessary one provided for the same recording surface, is activated to read writing head positioning information, and the reading head and the writing head of the plurality sets of reading heads and writing heads provided for each recording surface of the recording medium are provided in the vicinity of one another.

* * * * *